(12) United States Patent
Marsh et al.

(10) Patent No.: US 6,718,686 B2
(45) Date of Patent: Apr. 13, 2004

(54) INSECT REMOVAL DEVICE

(76) Inventors: Robert E. Marsh, 6000 Brookside Blvd., Kansas City, MO (US) 64113; Michael S. Wenzel, 3630 Ashland Ridge, Kansas City, MO (US) 64129

(*) Notice: Subject to any disclaimer, the term of this patent is extended or adjusted under 35 U.S.C. 154(b) by 0 days.

(21) Appl. No.: 10/074,619

(22) Filed: Feb. 13, 2002

(65) Prior Publication Data

US 2002/0112395 A1 Aug. 22, 2002

Related U.S. Application Data

(60) Provisional application No. 60/268,972, filed on Feb. 16, 2001.

(51) Int. Cl.[7] ................................................. A01M 1/14
(52) U.S. Cl. ............................................................ 43/114
(58) Field of Search ........................... 43/107, 112–114

(56) References Cited

U.S. PATENT DOCUMENTS

| | | | | |
|---|---|---|---|---|
| 3,913,259 A | * | 10/1975 | Nishimura et al. ........... | 43/114 |
| 4,748,767 A | * | 6/1988 | Sandels ...................... | 43/132.1 |
| 5,608,988 A | * | 3/1997 | Dowling et al. ............... | 43/114 |
| 5,634,293 A | * | 6/1997 | Mike et al. ................... | 43/114 |
| D388,859 S | * | 1/1998 | Carroll, Jr. .................. | D22/122 |
| 6,185,862 B1 | * | 2/2001 | Nelson ........................ | 43/136 |
| 6,360,477 B1 | * | 3/2002 | Flashinski et al. ............ | 223/86 |

FOREIGN PATENT DOCUMENTS

| | | | | |
|---|---|---|---|---|
| JP | 408001529 A | * | 1/1996 | ............. B25B/9/02 |

\* cited by examiner

*Primary Examiner*—Robert P. Swiatek
*Assistant Examiner*—Bethany L. Griles

(57) ABSTRACT

A device for the removal of insects, particularly ticks, from a human or animal host includes a foam backing with an adhesive surface that folds along a central folding axis. The adhesive surface will adhere to the body of the tick while the device is pulled away from the skin, resulting in the removal of the tick. The foam backing facilitates the application of pressure to the device and more complete adhesion to the body of the tick. A tab extending from the side of the backing opposite the adhesive is gripped between the user's thumb and forefinger and facilitates removal of the insect.

16 Claims, 3 Drawing Sheets

INSECT REMOVAL DEVICE

CROSS-REFERENCE TO RELATED APPLICATIONS

This application claims the benefit of U.S. Provisional Patent Application No. 60/268,972, filed Feb. 16, 2001.

STATEMENT REGARDING FEDERALLY SPONSORED OR DEVELOPMENT

Not Applicable

BACKGROUND OF THE INVENTION

This invention is a novel device for the removal of insects attached to a person or animal.

Certain insects, most notably ticks, attach themselves to a human or animal host. Once attached, they may be very difficult to remove. Many are so small that grasping them with fingers is not possible, and, even if possible, for sanitary reasons this is an undesirable method of removing them.

Various inventions have been proposed to address the tick problem. Some attempt to create a barrier that ticks cannot crawl past. Others are mechanical devices for removing ticks. These mechanical devices are typically similar to tweezers and grasp the tick while pressure is applied to pull it away from the skin. The problem with these mechanical devices is that the squeezing of the insect may force fluids back into the host or may physically damage the tick, resulting in the release of fluids and further difficulty in removing the tick. In addition, the force applied to remove the tick may result in the head breaking off and remaining attached to the host with no feasible means of removing it.

SUMMARY OF THE INVENTION

This invention is a device for the removal of insects, particularly ticks, from a human or animal host. The device includes an adhesive surface that folds along a central folding axis. The adhesive surface will adhere to the body of the tick while the device is pulled away from the skin, resulting in the removal of the tick. A foam backing facilitates the application of pressure to the device and more complete adhesion to the body of the tick. In a preferred embodiment of the invention the foam backing is angled or curved so that its thickness along the central folding axis of the device is thinner than at the outer ends of the device.

Objects of this invention include providing a device for firmly gripping an insect for removal, but with minimal pressure applied squeezing against the body of the insect. Another object is to provide a device for the safe and sanitary removal and disposal of insects attached to an animal host without direct physical contact with the body of the insect. Still another object is to provide a device that allows the attached insect to slip from the grip of the device before so much force is applied that the head of the insect breaks away from its body.

DETAILED DESCRIPTION OF THE INVENTION

Figure 1:
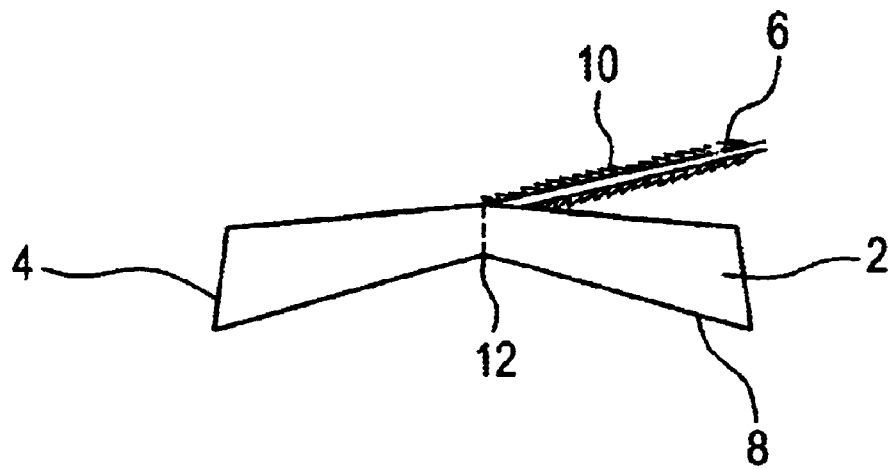
FIG. 1 shows the present invention prior to use.

As shown on the FIG. 1, a preferred embodiment of the present invention includes a backing (2), an adhesive surface (4), a tab (6), and a protective cover (8). The backing (2) is ideally a resilient foam material at least ¹/₂₄ inch in thickness, such as a vinyl or urethane foam. The adhesive surface (4) includes a suitable adhesive for adhesion to the body of an insect, such as a tick. The selection of a suitable adhesive would be well known to one skilled in the art. The tab (6) may be a thin piece of material attached to the backing (2) on the side opposite the adhesive or it may be made of the same material as the backing (2). In all cases the tab is attached to the backing on the side opposite the adhesive. Prior to use, the tab (6) folds down so that it lays flat relative to the backing so that when not in use the entire device is flat. The protective cover (8) is of a suitable material (well-known in the art) that will protect the adhesive surface, but is easily removed when the adhesive surface is to be applied to the insect. The surface of the backing and the surfaces of the tab may have a roughened surface, created, for example, by a coating (10) having a roughness greater that that of the uncoated backing or tab material to facilitate gripping of the backing and tab between the thumb and forefinger. Other means of creating a roughened surface (including the use of a backing material with inherent roughness) are well known in the art. For purposes of this description a surface would be considered "roughened" if it is rougher than a smooth vinyl or plastic material.

Figure 2:
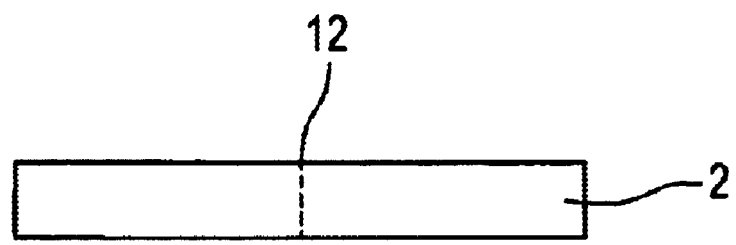
FIG. 2 shows a top view of the invention prior to use.

As shown in FIG. 2, in a preferred embodiment, the device (when viewed from above) is substantially rectangular in shape.

Figure 3:
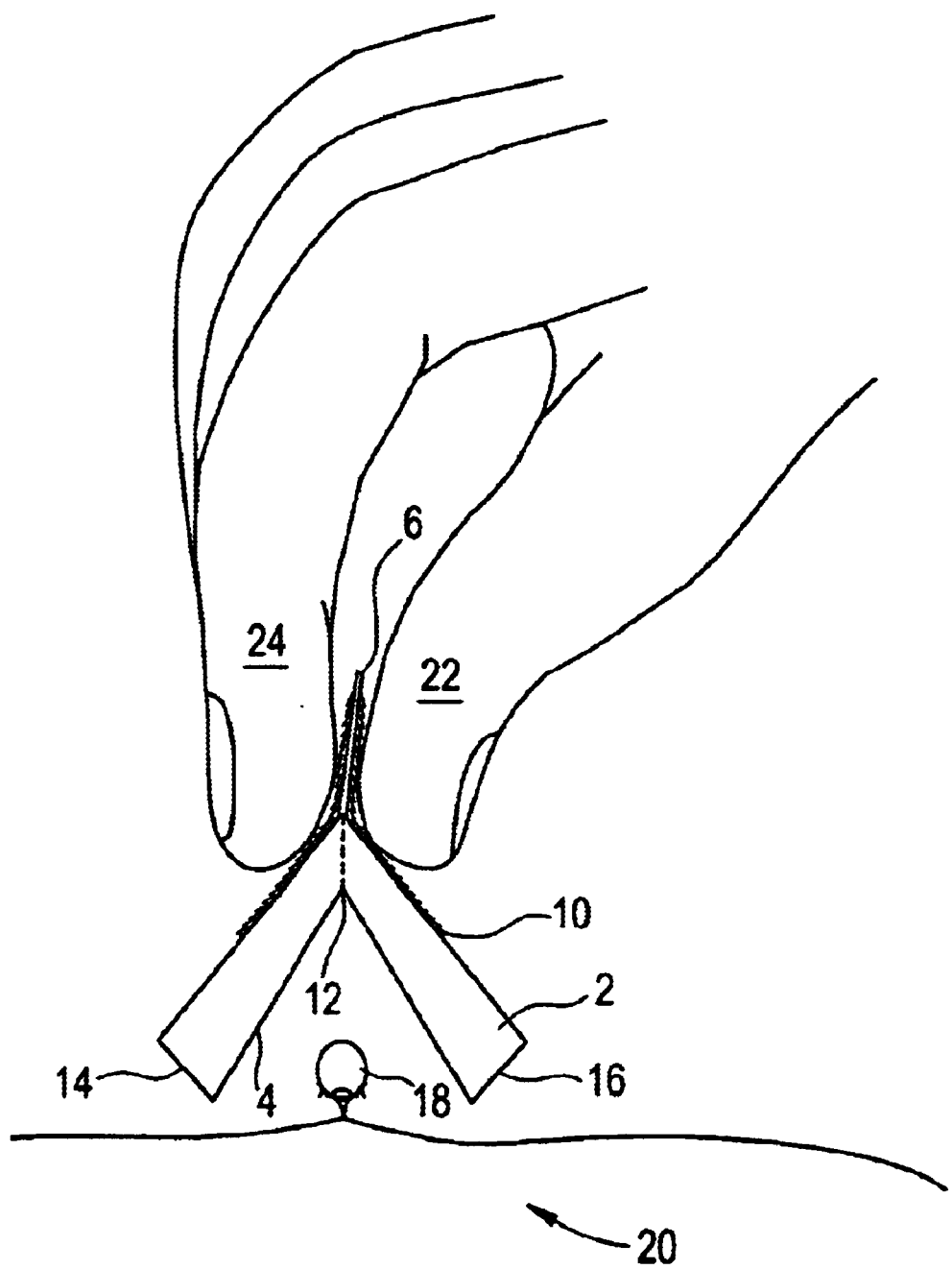
FIG. 3 shows the present invention folded by the fingers of a user and about to be placed over the body of an insect.

As shown in FIGS. 2 and 3, the backing (2) folds along a central folding axis (12) when the user applies pressure to opposite ends of the backing surface without adhesive. The greater thickness of the foam at the outer portions of the backing (14, 16) than the portion along the central folding axis (12) facilitates firm gripping of the insect by increasing the portion of the adhesive side of the backing that contacts the insect. In some situations (especially where larger ticks are to be removed) a concave-shaped backing (viewed from the adhesive surface of the backing) would be particularly advantageous.

Figure 4:
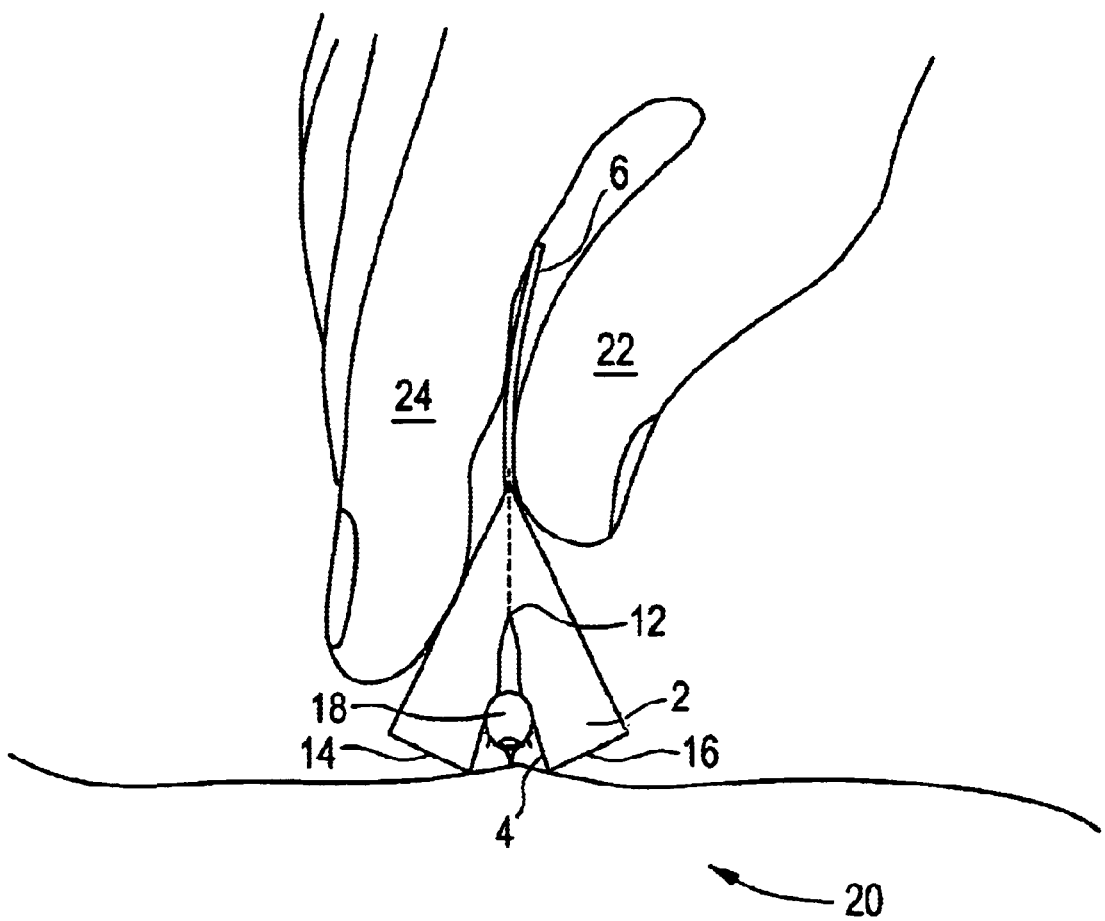
FIG. 4 shows the present invention closed around and in the process of removing an insect.

FIGS. 3 and 4 show the use of the invention. A tick (18) is attached to the skin of a host (20). The protective cover of the device (8) is removed from the adhesive surface of the device. The backing is folded slightly between a user's thumb (22) and forefinger (24) and the device is placed over the tick so that the tick is within the "V" formed by the folded adhesive surface (4) of the backing. If necessary, the fur or hair of the host should be separated from the site of the insect attachment. The user continues to apply pressure to both sides of the backing, continuing to fold the device at the central folding axis against the body of the tick. The tab (6) and the portions of the folded backing nearest the tab are then grasped by the user and the device is pulled away from the skin. The roughened surface (10) facilitates the final step of grasping and pulling the tick away from the point of attachment. If excessive force is applied, the device separates from the tick. If the appropriate amount of steady force is applied, the tick is pulled from the skin and the tick remains attached to the device for disposal. In most situations the device should be considered disposable and not be reused.

Suitable adhesives are well known in the art. In a preferred embodiment, the adhesive used is selected so that it is adhesion strength is such that the device will detach from the body of the tick before the head is broken away from the body. The selection of such an adhesive would be within the skill of an adhesive chemist.

It is also desirable to impregnate the adhesive surface with a suitable antiseptic or antibacterial substance to decrease the risk of infection at the site of the insect attachment.

From the foregoing it will be seen that this invention is one well adapted to attain all objects described above, together with other objects and advantages that are obvious and inherent to the structure of the device. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matters described above or shown in the accompanying drawings are to be interpreted as illustrative of the principles of this invention, and not in a limiting sense.

We claim:

1. A device for the removal of an insect attached to a host comprising a backing folding along a central folding axis to form two opposing adhesive surfaces between which the insect may be grasped, wherein said backing is a resilient foam with an adhesive surface on one side of the backing (and thus on both opposing adhesive surfaces) and no adhesive on the other side of the backing.

2. The device in claim 1 further comprising a tab extending from the side of the backing without adhesive at a point approximately opposite the central folding axis of the device.

3. The device in claim 2 wherein said tab has a roughened surface that facilitates gripping of the tab between the thumb and forefinger.

4. The device in claim 1 wherein the surface of said backing without adhesive has a roughened surface that facilitates gripping of the folded backing between the thumb and forefinger.

5. The device in claim 4 further comprising a tab extending from the side of the backing without adhesive at a point approximately opposite the central folding axis of the device.

6. The device in claim 5 wherein said tab has a roughened surface that facilitates gripping of the tab between the thumb and forefinger.

7. The device in claim 1 wherein the thickness of said backing at the central folding axis is less than the thickness of the backing at the ends furthest from the folding axis.

8. The device in claim 7 further comprising a tab extending from the side of the backing without adhesive at a point opposite the central folding axis of the device.

9. The device in claim 8 wherein said tab has a roughened surface that facilitates gripping of the tab between the thumb and forefinger.

10. The device in claim 7 wherein the surface of said backing without adhesive has a roughened surface that facilitates gripping of the folded backing between the thumb and forefinger.

11. The device in claim 9 wherein the surface of said backing without adhesive has a roughened surface that facilitates gripping of the folded backing between the thumb and forefinger.

12. The device in claim 7 wherein the backing is less than $1/16$ inch thick at the folding axis and at least $1/8$ inch thick at the ends furthest from the folding axis.

13. The device in claim 12 further comprising a tab extending from the side of the backing without adhesive at a point opposite the central folding axis of the device.

14. The device in claim 13 wherein said tab has a roughened surface that facilitates gripping of the tab between the thumb and forefinger.

15. The device in claim 12 wherein the surface of said backing without adhesive has a roughened surface that facilitates gripping of the folded backing between the thumb and forefinger.

16. The device in claim 15 wherein the surface of said backing without adhesive has a roughened surface that facilitates gripping of the folded backing between the thumb and forefinger.

* * * * *